US011320269B2

(12) United States Patent
Inoshita (10) Patent No.: US 11,320,269 B2
(45) Date of Patent: May 3, 2022

(54) INFORMATION PROCESSING APPARATUS, INFORMATION PROCESSING METHOD, AND INFORMATION PROCESSING PROGRAM

(71) Applicant: NEC CORPORATION, Tokyo (JP)

(72) Inventor: Tetsuo Inoshita, Tokyo (JP)

(73) Assignee: NEC CORPORATION, Tokyo (JP)

( * ) Notice: Subject to any disclaimer, the term of this patent is extended or adjusted under 35 U.S.C. 154(b) by 253 days.

(21) Appl. No.: 16/497,692

(22) PCT Filed: Mar. 31, 2017

(86) PCT No.: PCT/JP2017/013775
§ 371 (c)(1),
(2) Date: Sep. 25, 2019

(87) PCT Pub. No.: WO2018/179404
PCT Pub. Date: Oct. 4, 2018

(65) Prior Publication Data
US 2020/0033132 A1 Jan. 30, 2020

(51) Int. Cl.
*G01C 21/20* (2006.01)
*B64C 39/02* (2006.01)
(Continued)

(52) U.S. Cl.
CPC ............ *G01C 21/20* (2013.01); *B64C 39/024* (2013.01); *B64D 47/08* (2013.01); *G06K 9/0063* (2013.01);
(Continued)

(58) Field of Classification Search
CPC . G01C 21/20; B64C 39/024; B64C 2201/027; B64C 2201/18;
(Continued)

(56) References Cited

U.S. PATENT DOCUMENTS 6,260,797 B1 * 7/2001 Palmer .................. B64C 39/024
102/501
10,873,689 B2 * 12/2020 Inoshita ................. H04N 5/232
(Continued)

FOREIGN PATENT DOCUMENTS

| JP | 2003-127994 A | 5/2003 |
| JP | 2006-143193 A | 6/2006 |

(Continued)

OTHER PUBLICATIONS

International Search Report for PCT/JP2017/013775, dated May 30, 2017.
(Continued)

*Primary Examiner* — Yonel Beaulieu
(74) *Attorney, Agent, or Firm* — Sughrue Mion, PLLC (57) ABSTRACT

In order to fly a flying body more safely using a flight route according to a fall enable area, there is provided an image processing apparatus including a detector that detects a fall enable area on the ground surface based on a flying body video obtained when a flying body captures a ground area spreading below while moving. The image processing apparatus further includes a falling range estimator that estimates a falling range on the ground surface in case of a fall, and a decision unit that decides a flight route of the flying body such that the falling range is covered by the detected fall enable area.

8 Claims, 8 Drawing Sheets

(51) Int. Cl.
*B64D 47/08* (2006.01)
*G06K 9/00* (2006.01)

(52) U.S. Cl.
CPC .... *B64C 2201/027* (2013.01); *B64C 2201/18* (2013.01)

(58) Field of Classification Search
CPC .......... B64C 2201/123; B64C 2201/14; B64C 39/02; B64D 47/08; G06K 9/0063; G08G 5/0021; G08G 5/0052; G08G 5/0069; G08G 5/0086; G08G 5/00
See application file for complete search history.

(56) References Cited

U.S. PATENT DOCUMENTS

| | | | | |
|---|---|---|---|---|
| 11,105,775 | B2* | 8/2021 | Yamashita | G01N 29/12 |
| 2013/0176423 | A1* | 7/2013 | Rischmuller | G05D 1/0038 |
| | | | | 348/114 |
| 2013/0329052 | A1* | 12/2013 | Chew | G06K 9/00771 |
| | | | | 348/159 |
| 2016/0378121 | A1 | 12/2016 | Shue | |
| 2017/0004714 | A1* | 1/2017 | Rhee | G08G 5/0086 |
| 2017/0113798 | A1* | 4/2017 | Lee | B64C 39/024 |
| 2017/0158320 | A1* | 6/2017 | Bosch | B64C 27/52 |
| 2018/0114450 | A1* | 4/2018 | Glaab | G08G 5/0056 |
| 2019/0002124 | A1* | 1/2019 | Garvin | H04N 5/23238 |
| 2019/0302805 | A1* | 10/2019 | High | G05D 1/101 |
| 2020/0132883 | A1* | 4/2020 | Povar | G01W 1/08 |
| 2020/0234601 | A1* | 7/2020 | Ivanov | G08G 5/0069 |
| 2020/0278695 | A1* | 9/2020 | Tuukkanen | B64C 39/024 |
| 2020/0331607 | A1* | 10/2020 | Yamada | B64C 39/024 |

FOREIGN PATENT DOCUMENTS

| | | |
|---|---|---|
| JP | 2014-199548 A | 10/2014 |
| JP | 6051327 B1 | 12/2016 |
| WO | 2017/033976 A1 | 3/2017 |

OTHER PUBLICATIONS

Japanese Office Action for JP Application No. 2020-185181 dated Nov. 30, 2021 with English Translation.

* cited by examiner

| OBJECT | FEATURE AMOUNT | FALL ENABLE LEVEL |
|---|---|---|
| TREE AND MOUNTAIN | a a a a | 10 |
| SEA, RIVER, LAKE, AND POND | b b b b | 10 |
| BUILDING | c c c c | 8 |
| FIELD | d d d d | 7 |
| HOUSE | e e e e | 7 |
| ⋮ | ⋮ | ⋮ |
| ROADWAY AND RAILWAY TRACK | f f f f | 2 |
| SIDEWALK AND CAR | g g g g | 1 |
| PERSON, BICYCLE, AND MOTORCYCLE | h h h h | 0 |

| URGENCY | FLIGHT-ENABLE AREA (FALL ENABLE LEVEL) |
|---|---|
| 10 | 2 AND MORE |
| 9 | 3 AND MORE |
| 8 | 4 AND MORE |
| 7 | 5 AND MORE |
| ⋮ | ⋮ |
| 3 | 8 AND MORE |
| 2 | 9 AND MORE |
| 1 | 10 |

INFORMATION PROCESSING APPARATUS, INFORMATION PROCESSING METHOD, AND INFORMATION PROCESSING PROGRAM

CROSS REFERENCE TO RELATED APPLICATIONS

This application is a National Stage of Application No. PCT/JP2017/013775 filed Mar. 31, 2017.

TECHNICAL FIELD

The present invention relates to an information processing apparatus, an information processing method, and an information processing program.

BACKGROUND ART

In the above technical field, patent literature 1 discloses a technique of causing an unmanned aircraft to automatically avoid obstacles by inputting the coordinates of the obstacles in advance together with a flight route on the unmanned aircraft.

CITATION LIST

Patent Literature

Patent literature 1: Japanese Patent Laid-Open No. 2003-127994

SUMMARY OF THE INVENTION

Technical Problem

However, the technique described in the above literature cannot avoid danger associated with the fall of a flying body.

The present invention provides a technique of solving the above-described problem.

Solution to Problem

One example aspect of the present invention provides an information processing apparatus comprising:
a detector that detects a fall enable area on a ground surface based on a flying body video obtained when a flying body captures a ground area spreading below while moving;
a falling range estimator that estimates a falling range on the ground surface in case of a fall; and
a decision unit that decides a flight route of the flying body such that the falling range is covered by the detected fall enable area.

Another example aspect of the present invention provides an information processing method comprising:
detecting a fall enable area on a ground surface based on a flying body video obtained when a flying body captures a ground area spreading below while moving;
estimating a falling range on the ground surface in case of a fall; and
deciding a flight route of the flying body such that the falling range is covered by the detected fall enable area.

Still other example aspect of the present invention provides an information processing program for causing a computer to execute a method, comprising:
detecting a fall enable area on a ground surface based on a flying body video obtained when a flying body captures a ground area spreading below while moving;
estimating a falling range on the ground surface in case of a fall; and
deciding a flight route of the flying body such that the falling range is covered by the detected fall enable area.

Advantageous Effects of Invention

According to the present invention, a flight route according to a fall enable area is decided, making it possible to fly a flying body safely.

DESCRIPTION OF EXAMPLE EMBODIMENTS

Example embodiments of the present invention will now be described in detail with reference to the drawings. It should be noted that the relative arrangement of the components, the numerical expressions and numerical values set forth in these example embodiments do not limit the scope of the present invention unless it is specifically stated otherwise. Note that in the following explanation, a "flying body" is a so-called drone, which is an unmanned aircraft (UAV (Unmanned Aerial Vehicle)) capable of flying by remote control or autonomous control.

First Example Embodiment

An information processing apparatus 100 according to the first example embodiment of the present invention will be described with reference to FIG. 1. The information processing apparatus 100 is an apparatus configured to decide a flight route of a flying body.

Figure 1:
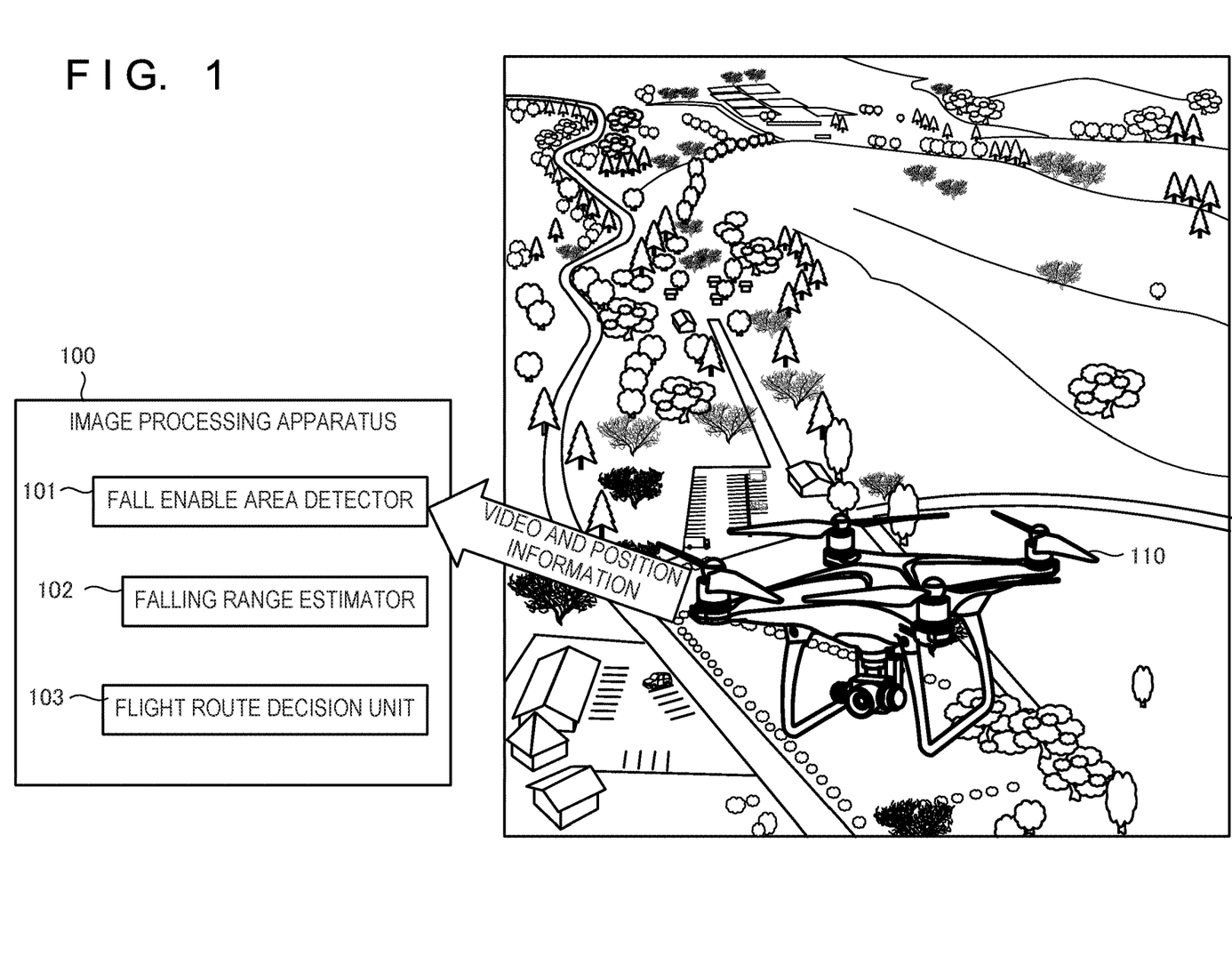
FIG. 1 is a block diagram showing the arrangement of an information processing apparatus according to the first example embodiment of the present invention.

As shown in FIG. 1, the information processing apparatus 100 includes a fall enable area detector 101, a falling range estimator 102, and a flight route decision unit 103.

The fall enable area detector 101 detects a fall enable area on the ground surface based on a flying body video obtained when a flying body 110 captures a ground area.

The falling range estimator 102 estimates a falling range on the ground surface in case of a fall of the flying body 110.

The flight route decision unit 103 decides the flight route of the flying body 110 such that the falling range is covered by the detected fall enable area.

According to the above-described arrangement, the flight route according to the fall enable area is decided, making it possible to fly the flying body more safely.

Second Example Embodiment

An information processing system according to the second example embodiment of the present invention will be described next with reference to FIG. 2 and subsequent views. Each of FIGS. 2 and 3 is a view showing an example of the flight route decided by the information processing apparatus according to this example embodiment.

Figure 2:
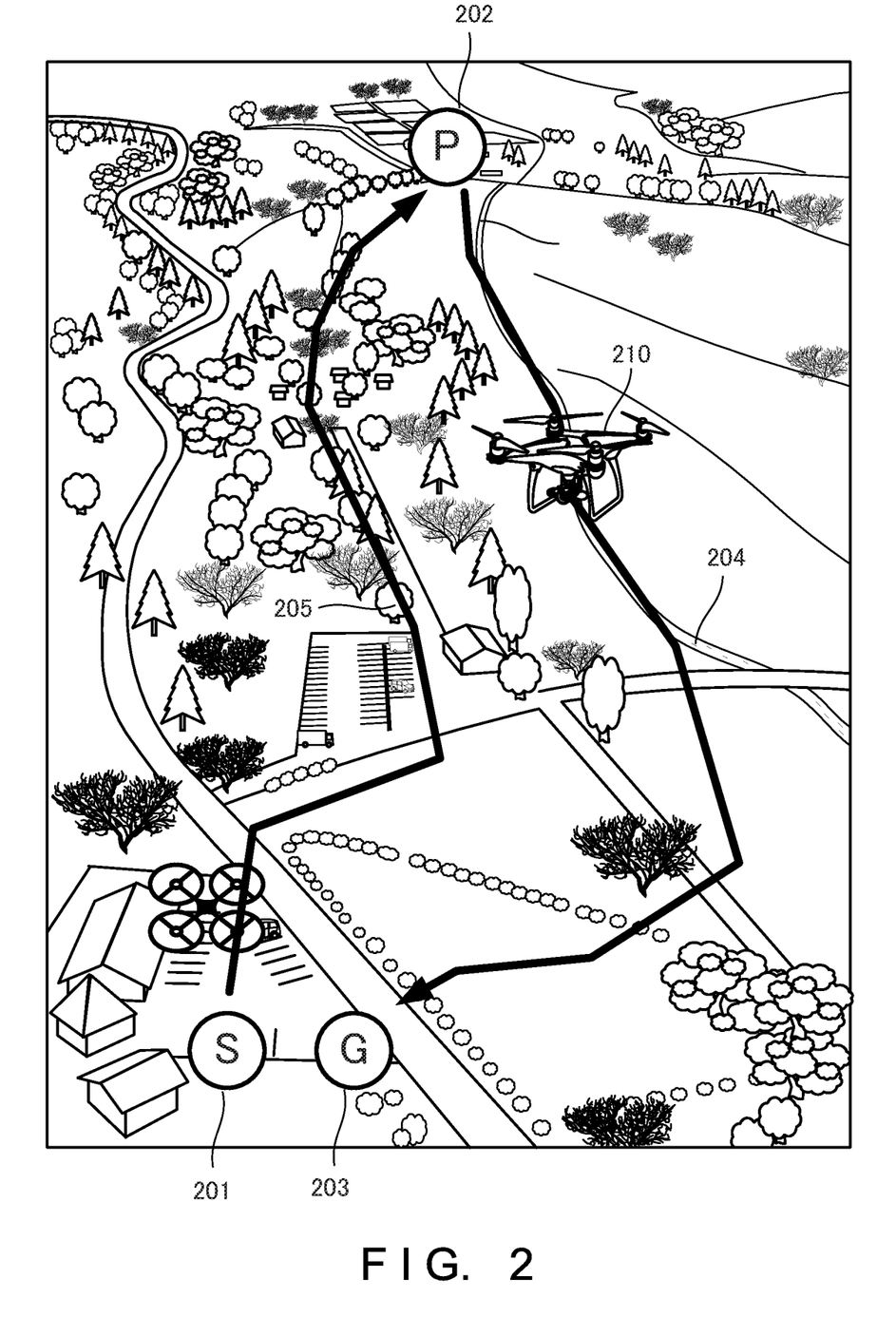
FIG. 2 is a view for explaining the usage of an information processing apparatus according to the second example embodiment of the present invention.

In FIG. 2, when planning the route of a flying body 210 which flies from a start position 201 to a target position 202 and then moves to a goal position 203, the captured video is analyzed and the area where a river 204 and a tree 205 exist is detected as a fall enable area.

A falling range on the ground surface in case of a fall of the flying body 110 is estimated, and the flight route of the flying body 210 is decided such that the estimated falling range is covered by the detected fall enable area.

Figure 3:
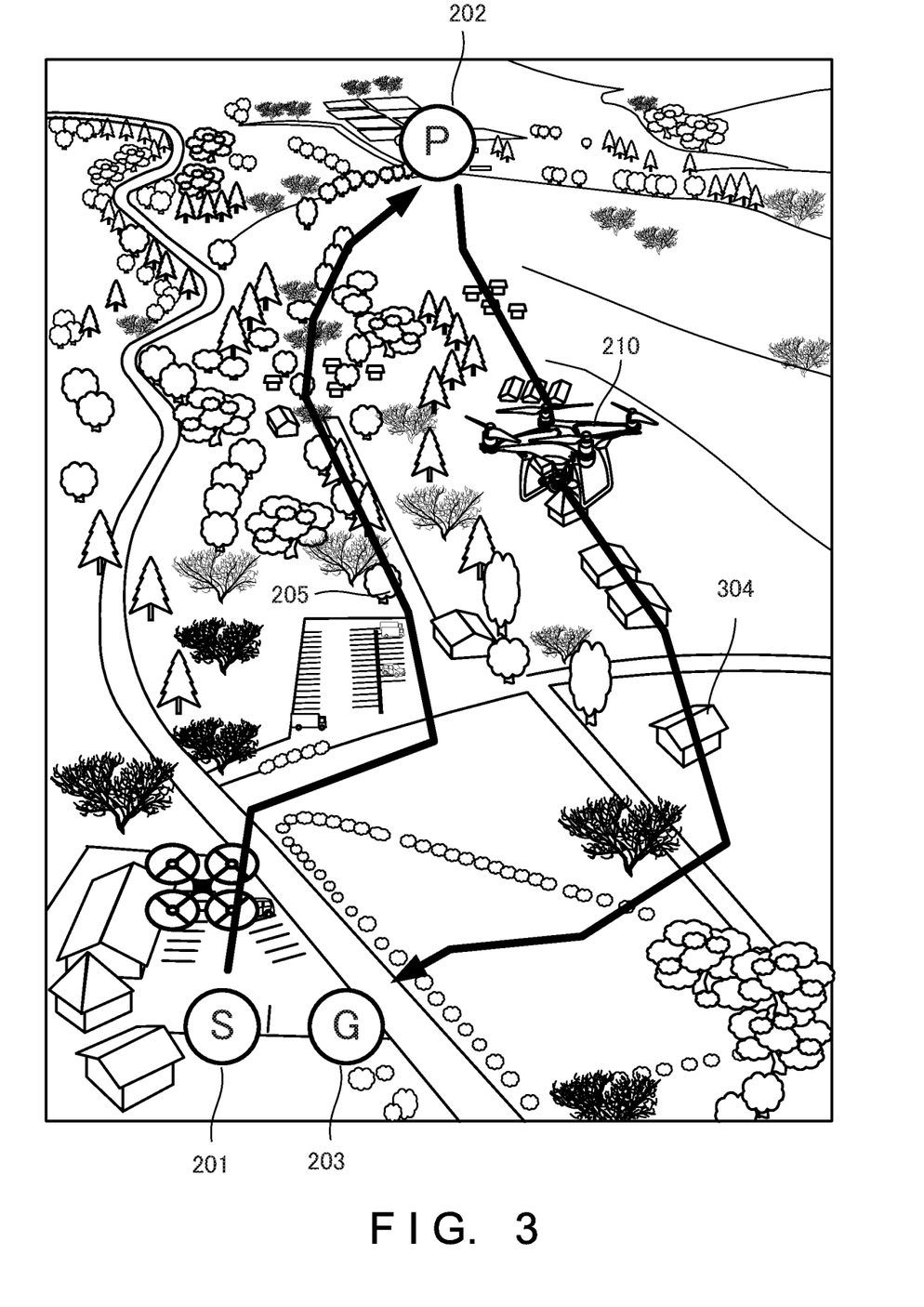
FIG. 3 is a view for explaining the usage of the information processing apparatus according to the second example embodiment of the present invention.

Similar in FIG. 3, when planning the route of the flying body 210 which flies from the start position 201 to the target position 202 and then moves to the goal position 203, the captured video is analyzed and the area where a house roof 304 and the tree 205 exist is detected as a fall enable area. The fall enable level of the house roof 304 is lower than that of the river 204 but higher than that of a road. Therefore, for example, in an emergency, the flying body 210 can move above the house roof 304 as the flight route.

Figure 4:
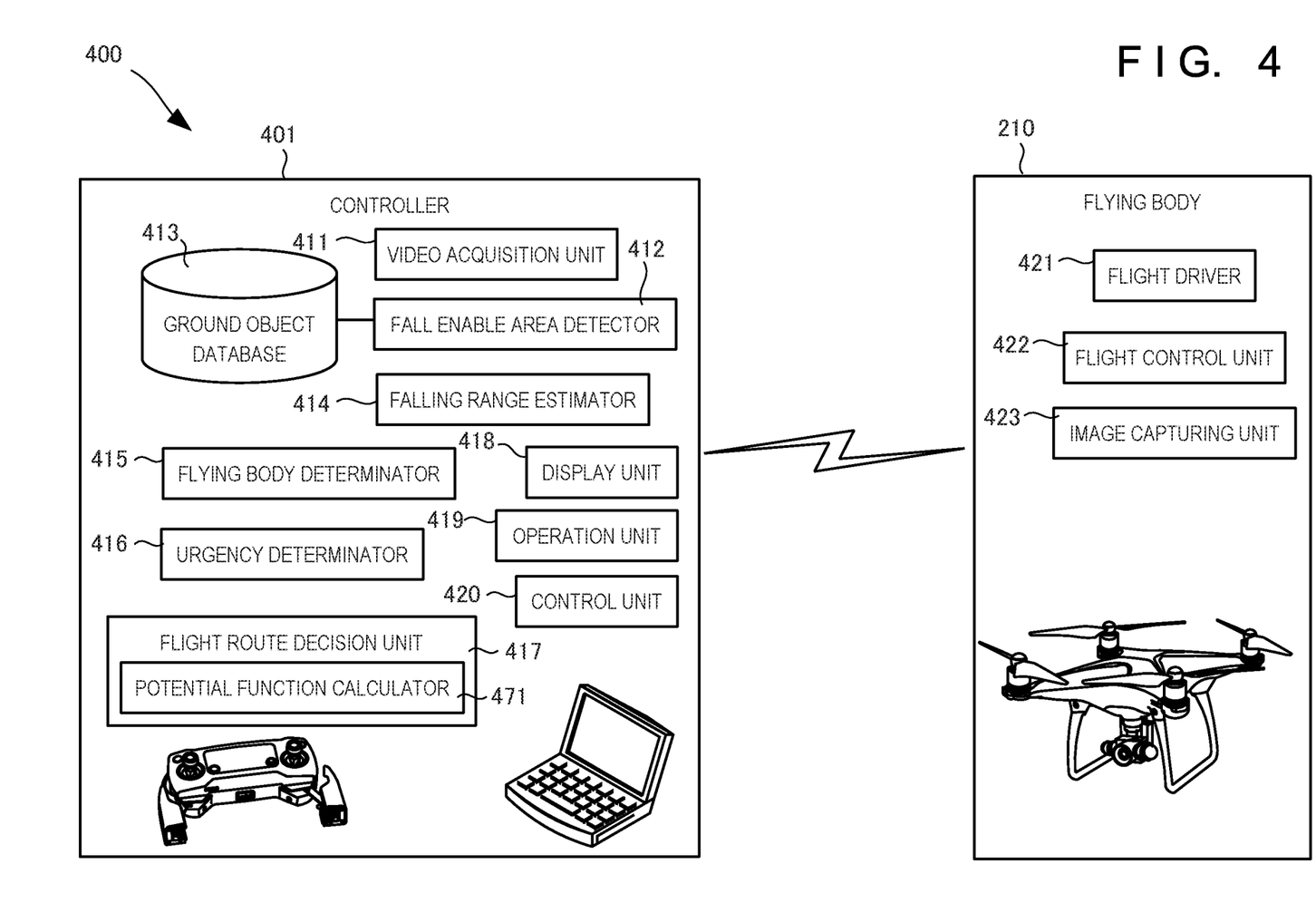
FIG. 4 is a block diagram showing the arrangement of the information processing apparatus according to the second example embodiment of the present invention.

FIG. 4 is a block diagram showing the arrangement of an information processing system 400 according to this example embodiment. The information processing system 400 includes a controller 401 and a flying body 210.

The controller 401 is a device having a calculation capability such as a so-called transmitter for radio-controlled toys or a notebook PC, and includes an image acquisition unit 411, a fall enable area detector 412, a ground object database 413, a falling range estimator 414, a flying body determinator 415, an urgency determinator 416, and a flight route decision unit 417. The controller 401 also includes a display unit 418, an operation unit 419, and a control unit 420. The flying body 210 includes a flight driver 421 including a propeller and a motor, a flight control unit 422 that controls the flight driver 421, and an image capturing unit 423 that captures a video.

Figure 5:
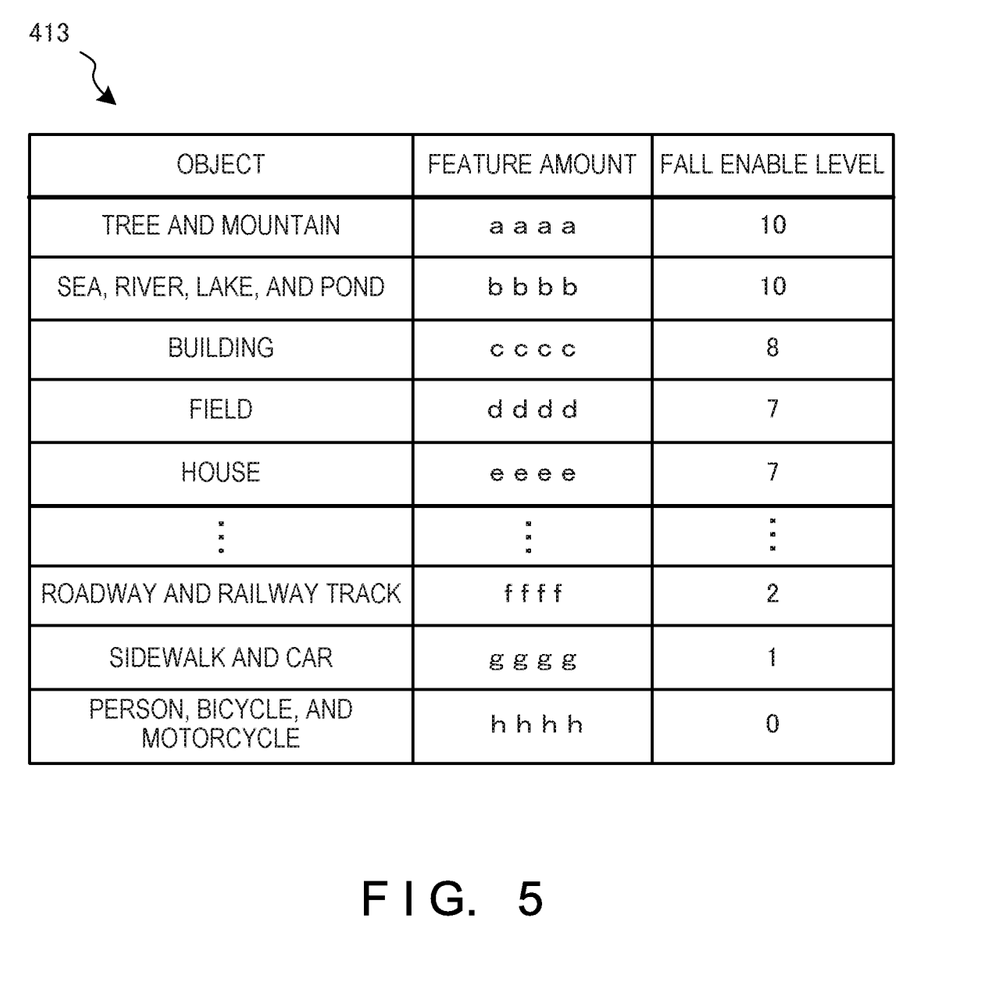
FIG. 5 is a view showing a table used in the information processing apparatus according to the second example embodiment of the present invention.

The image acquisition unit 411 acquires video data captured by the image capturing unit 423 of the flying body 210. The fall enable area detector 412 identifies various objects present on the ground surface using the video data acquired by the image acquisition unit 411, and detects a fall enable area on the ground surface by referring to the ground object database 413. FIG. 5 shows the contents of the ground object database 413. The feature amount in the video and the fall enable level are associated with each other for each type of object. More specifically, for example, a sea, a river, a lake, a pond, and the like are considered to have little damage to others even if the drone falls, therefore the fall enable level is set high. On the other hand, for a person, a bicycle, a motorcycle, and the like, the lowest fall enable level is set.

The falling range estimator 414 acquires a current position (latitude/longitude/height) from the flight control unit 422 of the flying body 210, and estimates the falling range of the flying body 210 from the current position. The falling range is an area on the ground surface and, in general, the higher the flying height, the larger the area. In order to estimate the falling range, the falling range estimator 414 may use a piece of information (wind speed, wind direction, or the like) about the wind at the position of the flying body 210 in addition to the height, moving direction, and moving speed of the flying body 210.

The flying body determinator 415 receives the model information of the flying body 210 from the flying body 210 and informs the fall enable area detector 412 of it. The fall enable area detector 412 performs weighting (addition/subtraction, multiplication by a factor, or the like) on the fall enable level in accordance with the weight and size of the flying body 210. For example, a method is possible such as adding 2 to the fall enable level when the flying body 210 is less than 1 kg and 20 cm square or less. On the other hand, when the flying body 210 is heavy and large, the fall enable level is lowered to reduce the flight-enable area.

The urgency determinator 416 determines the urgency of the flight and informs the flight route decision unit 417 of it.

Figure 6:
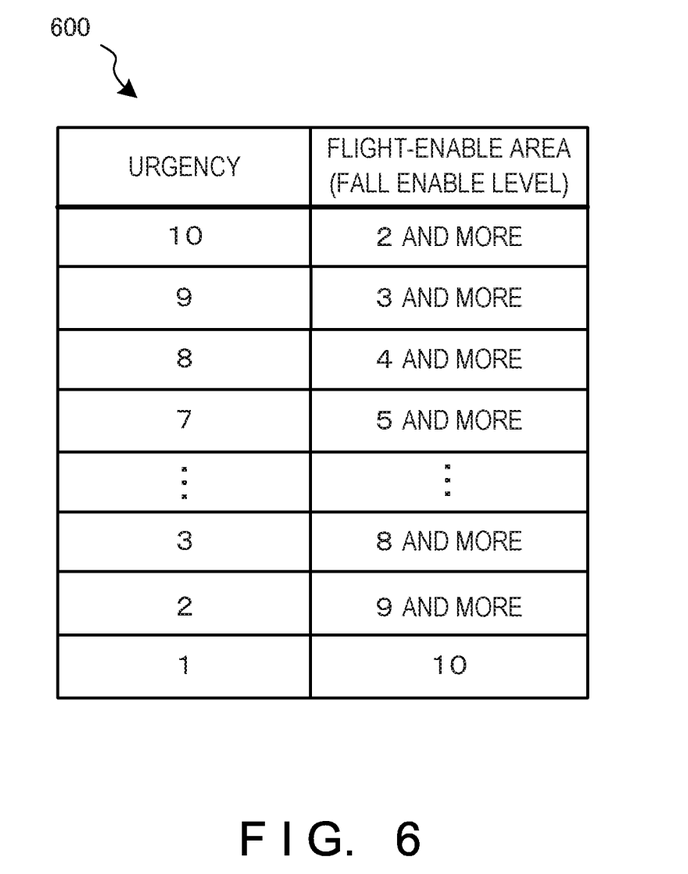
FIG. 6 is a view showing a table used in the information processing apparatus according to the second example embodiment of the present invention.

The flight route decision unit 417 decides a flight route in accordance with the determined urgency of the flight, the detected fall enable area, and the estimated falling range. For example, a table 600 shown in FIG. 6 is used to decide the fall enable area based on the urgency and to decide the flight route passing through that fall enable area. The flight route decision unit 417 includes a potential function calculator 471.

The potential function calculator 471 calculates a three-dimensional potential function defined in accordance with the position and type of a fall enable object and the height of the flying body from the ground surface.

Figure 7:
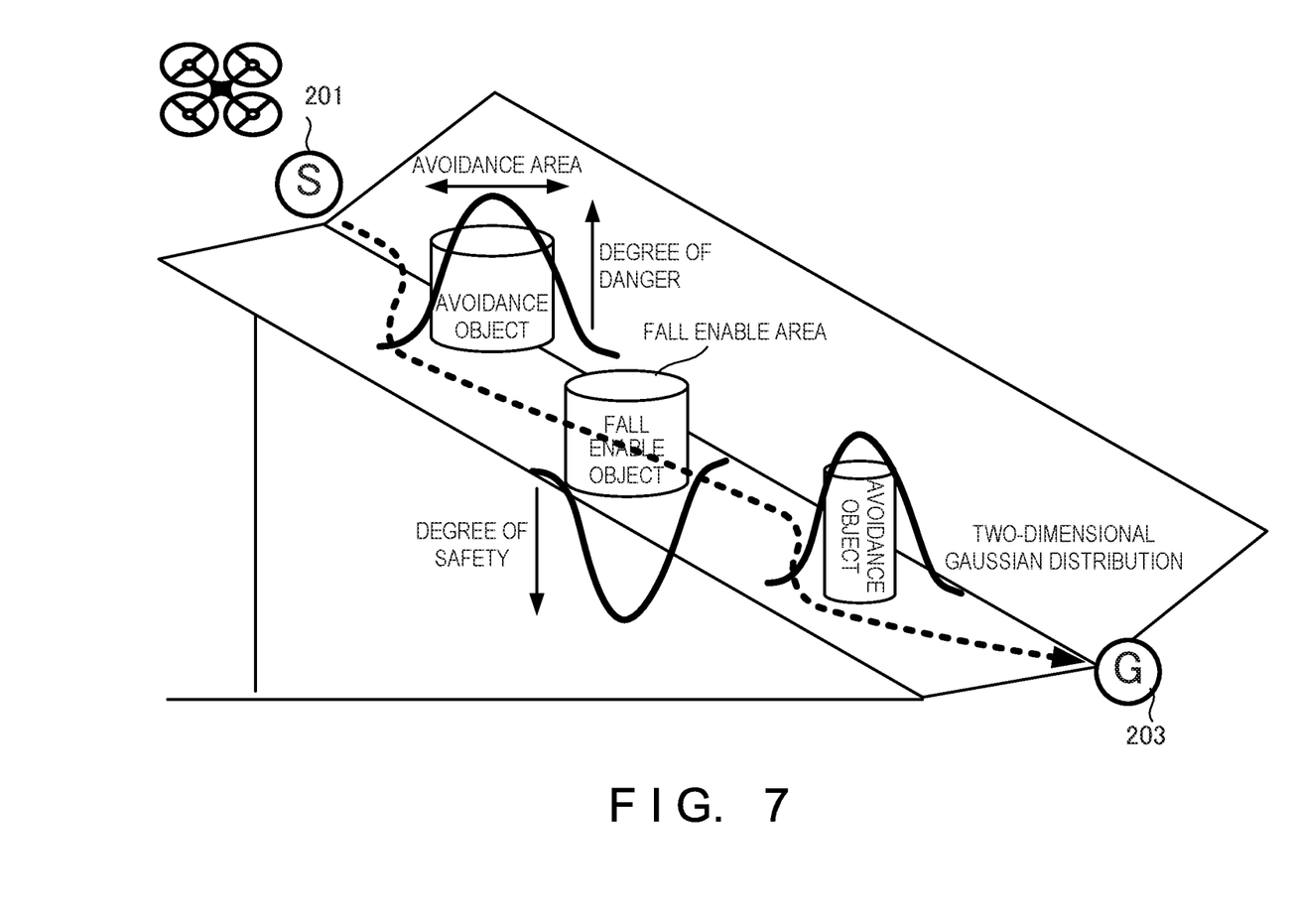
FIG. 7 is a view for explaining a method of deciding a flight route according to the second example embodiment of the present invention.

Furthermore, the three-dimensional potential function and a target position potential function defined in accordance with the coordinates of the moving target are superimposed to generate a potential field as shown in FIG. 7. In FIG. 7, based on the gradient of the potential field from the start position 201 to the goal position 203, a flight route is planned. More specifically, in a fall enable area, a potential function that has a negative Gaussian distribution is set in accordance with the fall enable area and the fall enable level. Alternatively, the potential field of the area other than the fall enable area is set high. In addition, when there is a fall disenable area, a potential function that has a positive Gaussian distribution may be set.

At this time, the falling range estimated by the falling range estimator 414 is also incorporated into the potential function. More specifically, if the flight height is higher than a certain value, the degree of danger uniquely defined for each avoidance object is increased by adding or accumulating a coefficient corresponding to the height, so that the degree of danger for each situation is reflected on the potential function. On the other hand, if the flight height is higher than the certain value, the degree of safety uniquely defined for each fall enable object is increased by adding or integrating a coefficient corresponding to the height, so that the degree of safety for each situation is reflected on the potential function. Depending on the wind direction or wind force, the degree of danger/safety may be changed. Furthermore, the shape of the fall enable area may be deformed into an anisotropic shape in accordance with the wind direction.

The display unit 418 displays a video captured by the image capturing unit 423. At that time, a fall enable area and a fall disenable area may be displayed in a distinguishable manner based on the information from the fall enable area detector 412.

The operation unit 419 accepts an operation by the user, and sends a control instruction to the flight control unit 422 of the flying body 210.

The control unit 420 controls the flight of the flying body 210 so as to travel the flight route decided by the flight route decision unit 417.

Figure 8:
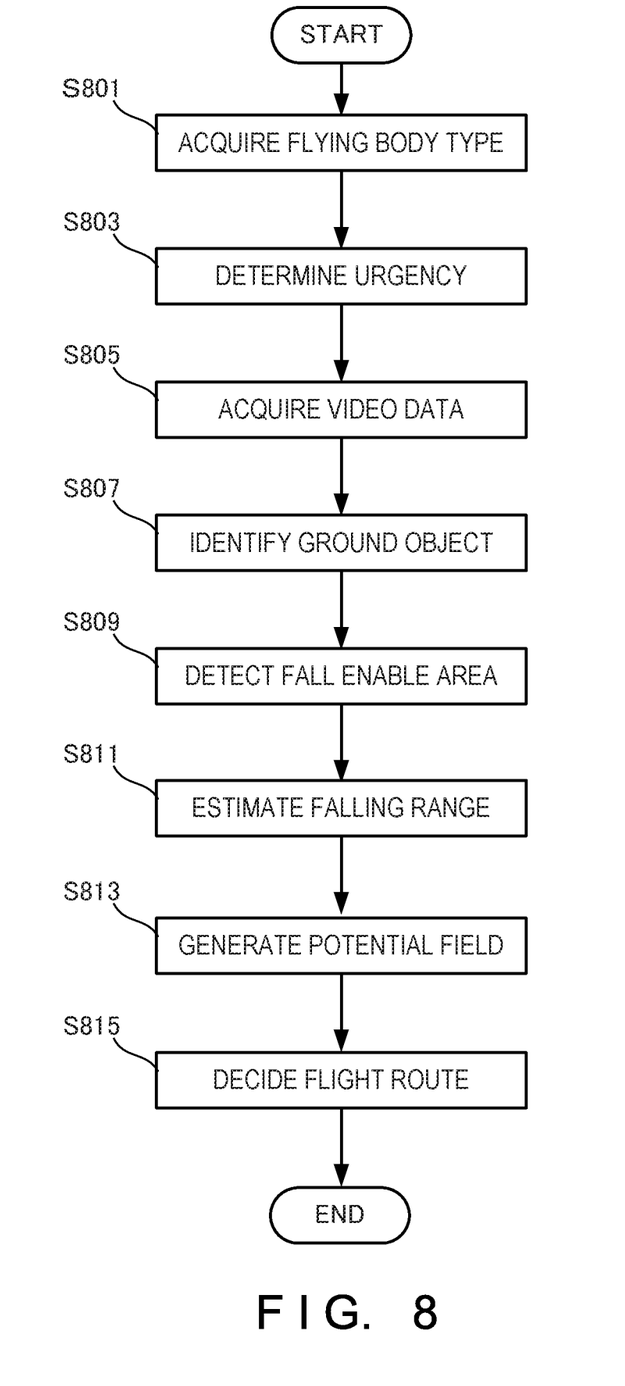
FIG. 8 is a flowchart showing the procedure of processing of the information processing apparatus according to the second example embodiment of the present invention.

FIG. 8 is a flowchart showing the procedure of processing in the controller 401. First, in step S801, the flight body type information is acquired from the flying body 210. Next, in step S803, the urgency of flying the flying body 210 to the target position is determined. Further, in step S805, video data captured by the flying body 210 during flight is acquired.

Next, in step S807, various objects present on the ground surface are identified using a known feature value analysis technique or the like for the video data. Further, in step S809, the fall enable area detector 412 detects a fall enable area while referring to the ground object database 413.

Then, in step S811, a falling range is estimated based on, for example, the type, flying height, and flying speed of the flying body 210.

In step S813, a three-dimensional potential function defined in accordance with the position and type of a fall enable object and the height of the flying body from the ground surface is calculated. Furthermore, the three-dimensional potential function and a target position potential function defined in accordance with the coordinates of a moving target are superimposed to generate a potential field. Then, a flight route is planned based on the gradient of the potential field from a start position to a goal position.

According to the above-described arrangement, the flight route preferentially passing through the fall enable area is decided using the potential function, making it possible to fly the flying body more safely.

Other Example Embodiments

While the invention has been particularly shown and described with reference to example embodiments thereof, the invention is not limited to these example embodiments. It will be understood by those of ordinary skill in the art that various changes in form and details may be made therein without departing from the spirit and scope of the present invention as defined by the claims.

The present invention is applicable to a system including a plurality of devices or a single apparatus. The present invention is also applicable even when an information processing program for implementing the functions of example embodiments is supplied to the system or apparatus directly or from a remote site. Hence, the present invention also incorporates the program installed in a computer to implement the functions of the present invention by the computer, a medium storing the program, and a WWW (World Wide Web) server that causes a user to download the program. Especially, the present invention incorporates at least a non-transitory computer readable medium storing a program that causes a computer to execute processing steps included in the above-described example embodiments.

The invention claimed is:

1. An information processing apparatus comprising:
a memory storing instructions; and
a processor configured to execute the instructions to:
detect a fall enable area on a ground surface based on a flying body video obtained when a flying body captures a ground area spreading below while moving;
estimate a falling range on the ground surface in case of a fall; and
decide a flight route of the flying body such that the falling range is covered by the detected fall enable area and in accordance with a gradient of a potential field generated by superimposing a three-dimensional potential function, which is defined in accordance with a type of a fall enable object and a height of the flying body from the ground surface, and a target position potential function defined in accordance with coordinates of a moving target.

2. The information processing apparatus according to claim 1, wherein the processor configured to execute the instructions to estimate the falling range on the ground surface in case of a fall of the flying body, based on a position, the height, and a moving speed of the flying body.

3. The information processing apparatus according to claim 1, wherein the processor configured to execute the instructions to further estimate the falling range based on information about wind that influences the flying body.

4. The information processing apparatus according to claim 1, wherein
the processor configured to execute the instructions to:
detect the fall enable area on the ground surface stepwise in accordance with a degree to which a fall is acceptable, and
select one level of the fall enable area from a plurality of levels of fall enable areas in accordance with an urgency of movement of the flying body.

5. The information processing apparatus according to claim 1, wherein the processor configured to execute the instructions to detect the fall enable area in accordance with a type of the flying body.

6. An information processing method comprising:
detecting a fall enable area on a ground surface based on a flying body video obtained when a flying body captures a ground area spreading below while moving;
estimating a falling range on the ground surface in case of a fall; and
deciding a flight route of the flying body such that the falling range is covered by the detected fall enable area and in accordance with a gradient of a potential field generated by superimposing a three-dimensional potential function, which is defined in accordance with a type of a fall enable object and a height of the flying body from the ground surface, and a target position potential function defined in accordance with coordinates of a moving target.

7. A non-transitory computer readable medium storing an information processing program for causing a computer to execute a method, comprising:
detecting a fall enable area on a ground surface based on a flying body video obtained when a flying body captures a ground area spreading below while moving;
estimating a falling range on the ground surface in case of a fall; and
deciding a flight route of the flying body such that the falling range is covered by the detected fall enable area and in accordance with a gradient of a potential field generated by superimposing a three-dimensional potential function, which is defined in accordance with a type of a fall enable object and a height of the flying body from the ground surface, and a target position potential function defined in accordance with coordinates of a moving target.

8. The information processing apparatus according to claim 1, wherein the processor is configured to execute the instructions to detect the fall enable area in accordance with the type of the fall enable object included in the flying body video.

* * * * *